United States Patent
Mckay et al.

(10) Patent No.: US 12,530,726 B2
(45) Date of Patent: Jan. 20, 2026

(54) POST DEPLOYMENT MODEL DRIFT DETECTION

(71) Applicant: Mind Foundry Ltd, Oxford (GB)

(72) Inventors: Helen Mckay, Ringwood (GB);
Bernardo Pérez Orozco, London (GB);
Francesca Garcia, London (GB);
Davide Zilli, Oxford (GB); Brian Mullins, Oxford (GB); Michael Osborne, Oxford (GB); Stephen Roberts, Shipton-on-Cherwell (GB);
Nicholas Sherman, Oxford (GB)

(73) Assignee: Mind Foundry Ltd, Oxford (GB)

( * ) Notice: Subject to any disclaimer, the term of this patent is extended or adjusted under 35 U.S.C. 154(b) by 108 days.

(21) Appl. No.: 18/497,447

(22) Filed: Oct. 30, 2023

(65) Prior Publication Data

US 2025/0139706 A1    May 1, 2025

(51) Int. Cl.
*G06N 20/00* (2019.01)
*G06Q 40/08* (2012.01)

(52) U.S. Cl.
CPC .................... *G06Q 40/08* (2013.01)

(58) Field of Classification Search
CPC .............. G06Q 40/08; G06N 20/00
See application file for complete search history.

(56) References Cited

U.S. PATENT DOCUMENTS 11,995,052 B1 * 5/2024 Wang ................. G06Q 10/1053
2021/0224696 A1 * 7/2021 Nasr-Azadani .......... G06N 5/01
2021/0390455 A1   12/2021 Schierz et al.
(Continued)

FOREIGN PATENT DOCUMENTS

EP            4141596 A1 *  3/2023  ......... G05B 13/0265
WO    WO-2019172956 A1 *  9/2019  ........... G06K 9/6218
(Continued)

OTHER PUBLICATIONS

Lindsay, India: Concept Drift Detection, Dec. 9, 2022, Medium, pp. 1-19. (Year: 2022).*
(Continued)

*Primary Examiner* — Bijendra K Shrestha
(74) *Attorney, Agent, or Firm* — Schwegman Lundberg & Woessner, P.A.

(57) ABSTRACT

A post-deployment drift detection monitoring of a predictive model is described. The method includes accessing a predictive performance metric of a machine learning model that is deployed at a server, the machine learning model being trained with an initial set of training data containing historical data, the predictive performance metric being based on the initial set of training data and an additional set of training data, the additional set of training data containing training data collected since training the machine learning model, detecting a drift based on the predictive performance metric exceeding a drift detection threshold, generating a drift warning notification to a client device, the drift warning notification indicating that the predictive performance metric exceeds the drift detection threshold, receiving a user feedback from the client device, and adjusting one of the machine learning model or the drift detection threshold based on the user feedback.

18 Claims, 9 Drawing Sheets

(56) References Cited

U.S. PATENT DOCUMENTS

| | | | |
|---|---|---|---|
| 2022/0180446 A1* | 6/2022 | Kern | G06N 3/08 |
| 2024/0120027 A1* | 4/2024 | Chari | G16B 40/20 |
| 2024/0211798 A1* | 6/2024 | Swaroop | G06F 11/3495 |
| 2024/0362472 A1* | 10/2024 | Fu | G06N 3/088 |
| 2024/0370768 A1* | 11/2024 | Huang | G06N 20/00 |
| 2025/0045626 A1* | 2/2025 | Suryanarayana | G06N 20/00 |
| 2025/0117694 A1* | 4/2025 | Pinho | G06N 20/00 |
| 2025/0124337 A1* | 4/2025 | Dar | G06N 20/00 |

FOREIGN PATENT DOCUMENTS

| | | | | |
|---|---|---|---|---|
| WO | WO-2021091918 A1 * | 5/2021 | | G06F 11/302 |
| WO | WO-2022214843 A1 * | 10/2022 | | G06N 3/088 |
| WO | WO-2023149880 A1 * | 8/2023 | | G06N 20/00 |
| WO | WO-2025093916 A1 | 5/2025 | | |

OTHER PUBLICATIONS

Vinayagasundaram et al.: Online Extreme Learning Machine for Handling Cocept Drift and Class Imbalance Problem, Mar. 2017, 4th International Conference on Signal Processing, Communications and Networking (ICSCN, 2017), pp. 1-6. (Year: 2017).*

Indialindsay: Concept Drift Detection, Dec. 9, 2022, Medium, pp. 1-19 (Year: 2022).*

Liu et al.: Concept Drift Detection Delay Index, May 5, 2023, IEEE Transactions on Knowledge and Data Engineering, vol. 35, No. 5, pp. 4585-4597. (Year: 2023).*

Haug et al.: Learning Parameter Distributions to Detect Concept Drift in Data Streams, Oct. 19, 2020, pp. 1-8 (Year: 2020).*

"International Application Serial No. PCT/IB2024/000584, International Search Report mailed Mar. 5, 2025", 3 pgs.

"International Application Serial No. PCT/IB2024/000584, Written Opinion mailed Mar. 5, 2025", 6 pgs.

* cited by examiner

POST DEPLOYMENT MODEL DRIFT DETECTION

TECHNICAL FIELD

The subject matter disclosed herein generally relates to methods, systems, and programs for a machine learning platform. Specifically, the present disclosure addresses systems, methods, and computer programs for detecting drift in machine learning models.

BACKGROUND

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data.

However, drift can affect the performance of a machine learning model in production as it slowly gets worse over time. This can happen due to changes in the distribution of the input data over time or the relationship between the input and the target. Drift means that the model provides predictions with lower accuracy than during the training period.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
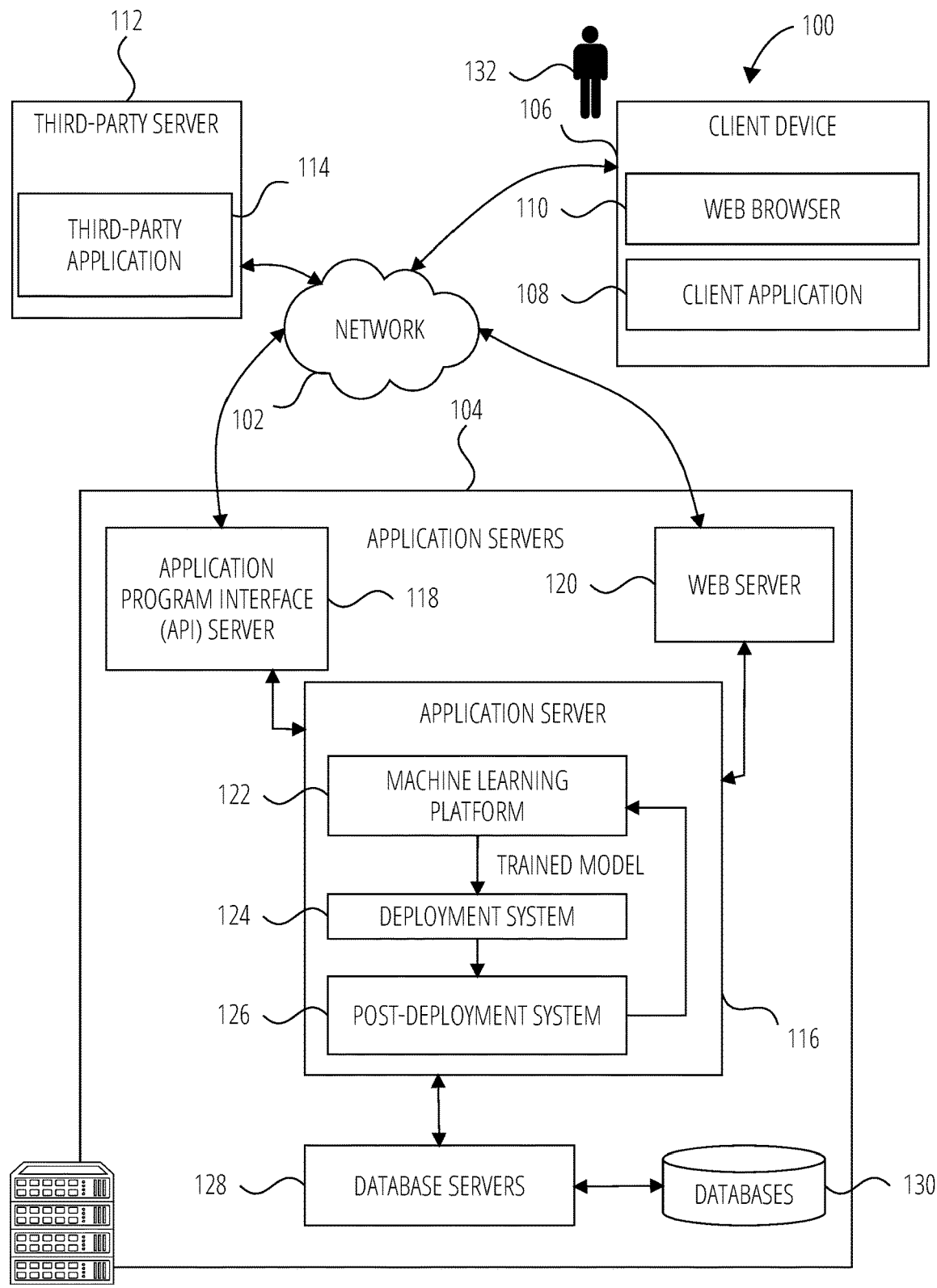
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

There are different types of drift, such as concept drift, data drift, label drift, and feature drift. Each type of drift affects the model in different ways and requires different strategies to detect and overcome. Some common ways to address drift are monitoring the model performance, retraining the model periodically, using online learning methods, and adapting the model to the new data distribution. However, these solutions do not address qualitative and quantative assessment of the drift that take into account human-AI collaboration input for fine tuning a drift detected sensitivity. As such, the conventional solutions may be too sensitive and generate false positive or not sensitive enough to allow for model drift.

The present application describes a method for automatically detecting a drift, notifying an end user that the drift has been detected, and warn the end user that the predictive model should be re-trained using more recently collected data. By notifying the end user about the drift, the predictive model can be kept up to date to ensure the longevity of the model so that it continues to make reliable predictions as more data is collected over time.

In one example embodiment, the presently-described platform includes a training phase, a prediction phase, a monitoring phase, and a human-AI collaboration phase. The training phase is considered to be pre-deployment. The prediction phase is at the point of deployment. The monitoring phase and the human-AI collaboration are post-deployment processes. These post-deployment processes are used to maintain predictive models throughout deployed model lifecycle to ensure the robustness of model predictions.

An initial model, such as a Generalized Linear Model (GLM), is trained using historical data. Once the initial model is trained and deployed to make predictions for newly collected data, the monitoring phase will automatically identify drift by monitoring the predictive performance of the deployed model. Upon the identification of a drift, the monitoring phase provides a warning to the user alongside with a supplementary automatically generated report highlighting potential causes of drift. These warnings indicate to the user when a model should be retrained, and the user can make an informed decision whether to retrain based on the information provided in the automatically generated report.

The human-AI collaboration phase enables human-AI collaboration such that if the user determines that a drift has occurred, the predictive model can be retrained using the most recently collected data. The predictive model is retrained and updated so that it remains accurate over time. If the user determines from the automatically generated report that the detection of a drift has been caused by noise in the data then the user can decrease the detector's sensitivity to drift to reduce false detections in the presence of noise.

In other words, the human-AI collaboration can be used for handling concept drift to improve the robustness of drift detection. When the automated drift detector identifies a potential drift, it generates a warning and report for the human user. The user can then leverage their domain expertise to review the report and determine if an actual drift occurred. This allows the user to confirm true drifts that require retraining, or reject false detections that may be caused by noise in the data. If false detections happen frequently, the user can provide feedback to adjust the sensitivity of the drift detector to reduce false positives in the future. By incorporating human judgement, the accuracy of drift detection can be improved. The detector alone may be prone to incorrect detections due to noise or changes in data distributions. The domain expert can determine if changes warrant retraining or if the model is still effective despite statistical changes. Additionally, allowing adjustable sensitivity based on user feedback enables customizing the detector's behavior for the specific data at hand. As the data characteristics change over time, the sensitivity can be tuned to optimize drift detection.

One example application of automated drift detection techniques can be applied to insurance risk modeling applications by monitoring predictive performance metrics of deployed models. This enables identifying when retraining is needed without manual oversight. The system issues warnings to users when drift is detected based on supplementary drift analysis report for explainability, and its human-AI collaboration features (allowing user feedback to confirm drifts and adjust detector sensitivity over time). This provides more robust handling of potential false detections. Another example application described in the present document includes vehicular insurance claims.

As a result, one or more of the methodologies described herein facilitate solving the technical problem of detecting drift in deployed machine learning models with human-AI collaboration. As such, one or more of the methodologies described herein may obviate a need for certain efforts or computing resources that otherwise would be involved in using machine learning platforms. As a result, resources used by one or more machines, databases, or devices (e.g., within the environment) may be reduced. Examples of such computing resources include Processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A web browser 110 (e.g., a browser) and a client application 108 (e.g., an "app") are hosted and execute on the web browser 110. A user 132 operates client device 106.

An Application Program Interface (API) server 118 and a web server 120 provide respective programmatic and web interfaces to application servers 104. A specific application server 116 hosts a machine learning platform 122 (which includes Components, modules and/or applications), a deployment system 124, and a post-deployment system 126.

The machine learning platform 122 receives training data from the client device 106, the third-party server 112, and/or the post-deployment system 126. The machine learning platform 122 generates a machine learning model based on the training data. The machine learning platform 122 deploys the machine learning model and monitors a performance (e.g., accuracy) of the machine learning model. In some example embodiments, the machine learning platform 122 includes machine-learning programs (MLPs), also referred to as machine-learning algorithms or tools, that are utilized to perform operations associated with predicting a value of an item at a future point in time, solving values of a target column, or discovering features of training data.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a machine learning model from training data in order to make data-driven predictions or decisions expressed as outputs. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying attributes of the training data or identifying patterns in the training data.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, machine learning algorithms identify patterns of significance in relation to other attributes in the training data. These algorithms utilize this training data to model such similar relations that might affect a predictive outcome.

The machine learning platform 122 includes a programmatic application accessed by the client device 106. Example of programmatic applications include a data scientist portal application, a machine learning portal application, and analysis applications. The machine learning platform 122 determines a machine learning training strategy that is used to configure an underlying learning model and to select how much training data to use. The machine learning platform 122 trains a machine learning model based on the underlying model and the selected training data. The machine learning platform 122 monitors actual resources used by the machine learning platform 122 during training of the machine learning model.

The deployment system 124 is responsible for deploying trained machine learning models so that they can be used to generate predictions. In one example, the deployment system 124 includes a deployment engine that handles the technical details of deploying models. Some functions of the deployment system 124 include:

Provisioning infrastructure so that deployed models exist in a queryable state and can be called to make predictions on new data. This may involve setting up prediction APIs, cloud services, etc.

Uploading trained model artifacts like parameters or code to the deployment infrastructure. This replicates the trained model so it can run in production environments.

Enabling external applications to access and use deployed models to generate forecasts and predictions. For example, a client application could call prediction APIs.

Storing deployed models in a model repository or registry for management and governance.

Monitoring the ongoing performance of deployed models by tracking prediction accuracy on new streaming data.

Detecting performance drops and triggering actions like retraining models or alerting users.

As such, the deployment system 124 handles the full lifecycle of taking a trained model and deploying it such that it can be consumed by applications to make predictions. It also monitors the models to ensure they stay accurate over time and trigger corrective actions as needed.

The post-deployment system 126 is responsible for monitoring deployed models and detecting concept drift. Some of their functions include:

- Continuously monitoring the performance of deployed models by tracking prediction accuracy/error metrics.
- Using concept drift detection strategies like ADWIN to identify significant changes in the performance metrics that likely indicate a drift.
- Generating warnings and notifications for users when drift is detected to indicate retraining may be necessary.
- Producing detailed drift reports analyzing data distribution changes before/after drift and other factors that explain the cause of drift and provide insights to the user.
- Enabling human-AI collaboration by allowing users to confirm/reject drifts and provide feedback to adjust the detector's sensitivity.
- Retraining models on new data when drift is confirmed and models need updating.

The post-deployment system 126 focuses on the ongoing maintenance and monitoring of deployed models. By automatically detecting drift and informing users, the post-deployment system 126 aims to keep models accurate over time as data distributions change. The human-AI collaboration also allows improving the reliability of drift detection by having a human in the loop. As such, the post-deployment system 126 handles drift detection, analysis, and retraining to ensure deployed models remain effective. Its automated monitoring removes the need for manual oversight.

Traditionally, model performance monitoring is done manually by having domain experts periodically evaluate metrics and use their judgement to determine if retraining is needed. In contrast, the post-deployment system 126 uses automated concept drift detection strategies like ADWIN to continuously monitor performance and detect changes likely indicating drift. This removes the need for manual oversight.

Some advantages of the automated approach include:

- Drifts can be detected sooner compared to periodic human review. This allows taking corrective action faster before model accuracy degrades further.
- Does not rely on availability of domain experts to frequently check metrics and make subjective determinations.
- Can detect more subtle drifts that humans may miss when reviewing a dashboard of metrics.
- Allows for 24/7 monitoring versus limited windows for human analysis.
- Reduces potential for human error in identifying drifts.
- Provides greater consistency in drift detection across different models.

Additionally, the post-deployment system enhances traditional automated monitoring by incorporating human-AI collaboration. This improves robustness by having a human confirm drifts and adjust sensitivity to reduce false detections. As such, automated drift detection offers timeliness, consistency, and robustness advantages over periodic manual monitoring. Human-AI collaboration further bolsters the reliability of the drift detection.

The web browser 110 communicates with the machine learning platform 122, the deployment system 124, and the post-deployment system 126 via the web interface supported by the web server 120. Similarly, the client application 108 communicates with the machine learning platform 122, deployment system 124, post-deployment system 126 via the programmatic interface provided by the Application Program Interface (API) server 118.

The application server 116 is shown to be communicatively coupled to database servers 128 that facilitates access to an information storage repository or databases 130. In an example embodiment, the databases 130 includes storage devices that store information (e.g., training dataset, resource limits configuration, model hyper-parameters, underlying models, augmented dataset, dataset marketplace, machine learning models) to be processed by the machine learning platform 122, deployment system 124, and post-deployment system 126.

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may support one or more features or functions on a website hosted by the third party. For example, the third-party application 114 provides training functionalities/operations for the the machine learning platform 122.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 106 may be embodied within the network environment 100. Furthermore, some Components or functions of the network environment 100 may be combined or located elsewhere in the network environment 100. For example, some of the functions of the client device 106 may be embodied at the application server 116.

Figure 2:
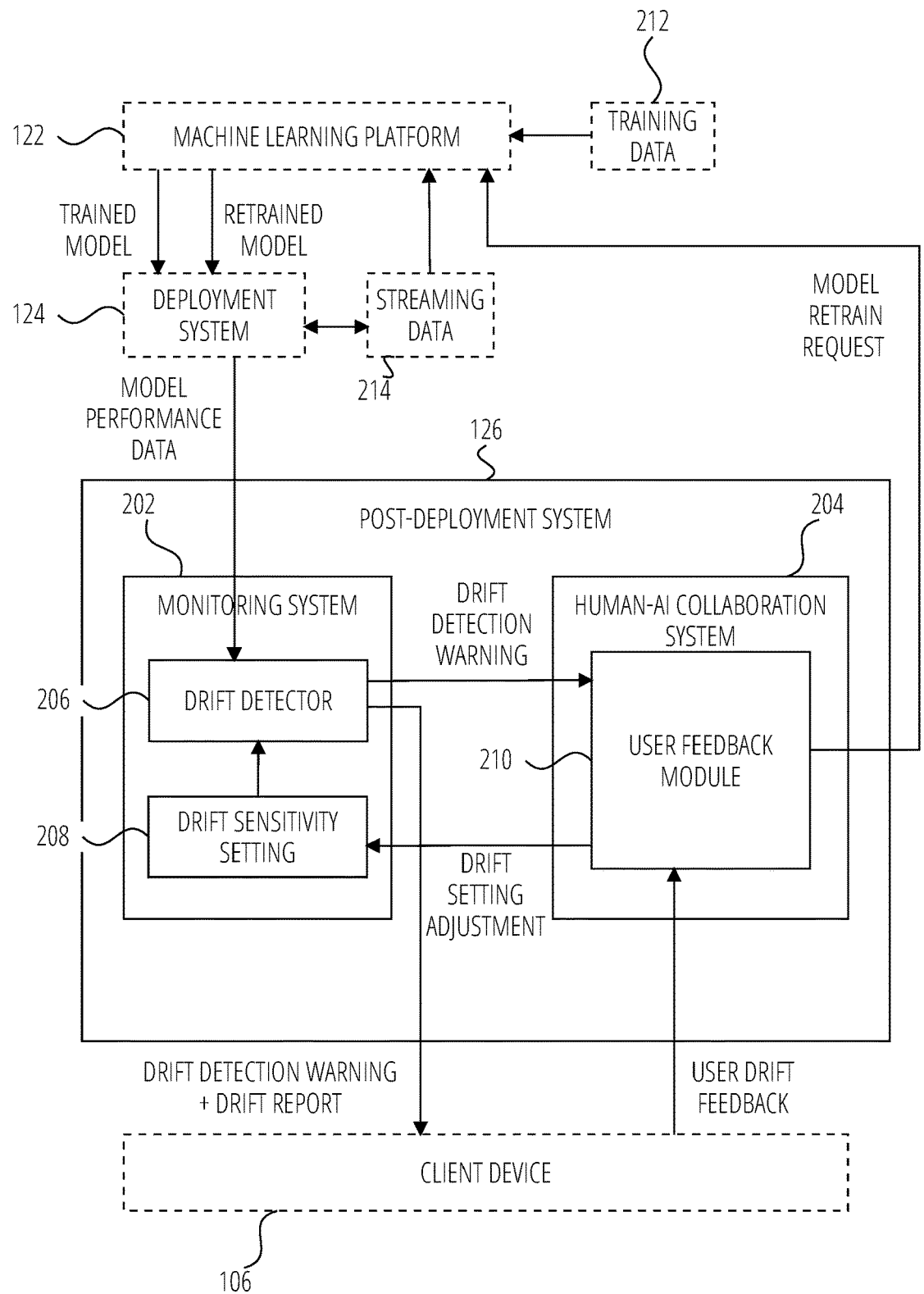
FIG. 2 illustrates a post-deployment system in accordance with one example embodiment.

FIG. 2 illustrates the post-deployment system 126 according to one example embodiment.

The Machine Learning Platform 122 initially trains a model on training data 212, producing a trained model. The deployment system 124 deploys the trained model.

The post-deployment system 126 includes a monitoring system 202 and a human-AI collaboration system 204. The monitoring system 202 accesses model performance data from the deployed trained model.

The drift detector 206 analyzes performance metrics of the deployed model to detect significant changes indicating drift. The drift detector 206 uses a drift sensitivity setting 208 to adjust a drift sensitivity threshold.

In one example, the drift detector 206 monitors the predictive performance metrics of the deployed model over time as new data comes in (e.g., streaming data 214). This includes accuracy metrics like error rate. The drift detector 206 analyzes these performance metrics using a concept drift detection algorithm like ADWIN. ADWIN works by dividing the performance data into windows and comparing the average performance between windows. If there is a statistically significant difference in the averages, this indicates a concept drift may have occurred.

More specifically, ADWIN maintains an adaptive sliding window over the performance data stream. It divides this window into two subwindows and compares their averages. If the averages differ by more than a defined drift threshold, a drift is flagged. The drift threshold can be tuned as the Drift Sensitivity Setting based on user feedback to reduce false positives. For example, a lower threshold makes the detector more sensitive.

The frequency of operating the drift detector 206 depends on several factors:
- Expected rate of change—How quickly are underlying data relationships likely to change? Monitoring should be more frequent for volatile environments.
- Model criticality—More frequent monitoring needed for models where poor predictions have high impact (e.g. fraud detection).
- Data volume—Enough data needed between checks to reliably assess performance. May need less frequent checks for low volume data.
- Computational cost—Frequent monitoring incurs higher compute costs. Need to balance with value of up-to-date models.
- Business cycles—Align drift checks with natural cycles; weekly/monthly for consumer patterns, quarterly/annually for economic trends.

Given these factors, some typical monitoring frequencies could be:
- High frequency—Daily or weekly for models on rapidly changing data like user behavior, fraud detection.
- Moderate frequency—Monthly checks for models of moderately dynamic systems like inventory or marketing.
- Low frequency—Quarterly or annually for models on slowly changing data like economic forecasts.

Ideally, the frequency should be dynamically adjustable based on observed drift rate, rather than fixed. Models could also trigger immediate checks if sudden performance changes occur. Frequent monitoring is advisable for mission critical models. The costs should be weighed against the value of keeping predictions accurate.

As such, the drift detector 206 uses performance metrics like accuracy/error rate and analyzes the data distribution over time windows to quantify changes in performance. It flags drifts when a significant performance change is statistically detected. The sensitivity can be tuned to balance detecting real drift vs. false alarms based on user feedback.

The following techniques can help make the drift detector 206 more robust to noise and outliers:

- Use statistical techniques like smoothing or averaging performance over time windows rather than looking at individual data points. This reduces the influence of transient noise or outliers.
- Employ a confirmation window after initial drift detection to ensure the change persists before triggering a warning. This prevents acting on temporary blips.
- Use a significance test like a t-test to compare performance between windows. Only flag drifts with statistically significant changes rather than small fluctuations.
- Set the drift threshold appropriately based on the expected noise and variability in the data. A higher threshold prevents overreacting to noise.
- Allow the user to adjust the drift threshold and sensitivity over time as they observe false positives. This customizes it to the data.
- Use an ensemble of detectors and only consider drifts when multiple agree. This provides more robust signal.
- Compare performance to multiple historical windows rather than just the immediate past. Ensures wider context.
- Log and analyze false positives over time. Use this to refine parameters and algorithms to adapt to data issues.
- Select/engineer robust performance metrics that are less sensitive to outliers or noise.

In response to detecting a drift, the drift detector 206 generates a drift detection warning to the user feedback module 210 of the human-AI collaboration system 204 and to the client device 106. The drift detector 206 also generates a drift report (containing an analysis of what may have caused the drift) that is sent to the client device 106 to notify the user.

The client device 106 provides user drift feedback to the user feedback module 210. The user feedback module 210 allows the user to review the warning and report and confirm true drifts that require retraining the model with new data, or reject false drifts by adjusting the drift sensitivity to reduce false detections.

In one example, the drift detection report includes the following metrics and visualizations to help the user identify and confirm drifts:

Metrics:
- The drift point—the time location where drift was detected
- Overview of performance metrics—accuracy, error rate, etc.
- Change in predictive performance—comparison of metrics before and after drift
- Future performance comparison—estimated future performance with and without retraining
- Statistical differences in input data—changes in means, variance, distribution, class imbalance, bias Visualizations:
- Graph of historical predictive performance before drift vs after
- Flagged instances—predictions after drift that may need review
- Recommendation—whether the system recommends retraining These metrics and visualizations allow the user to assess the magnitude of the performance change, understand how the input data has changed, identify any biased predictions after drift, and visualize the performance trends.

Significant degradations in performance metrics, large changes in input statistics, and divergence in historical vs post-drift performance graphs help confirm that a real concept drift has likely occurred. This supplementary information equips the expert to make an informed decision on whether to retrain the model.

The human-AI collaboration system 204 uses user feedback to improve drift detection in two key ways:

Confirming true drifts and retraining models: When a drift is detected, the user reviews the auto-generated drift report and uses their domain expertise to confirm if a real concept drift has occurred. If the user confirms the drift is real, they can request the model be retrained on the latest data to update it and maintain accuracy. This human confirmation acts as a check on the automated drift detection, ensuring models are only retrained when truly needed.

Rejecting false drifts and adjusting sensitivity: The user can also reject false drift detections that were likely caused by noise or normal data fluctuations rather than real concept drift. When false detections happen frequently, the user can provide feedback to adjust the drift sensitivity setting to make the detector less sensitive and reduce false positives. This allows tuning the drift detector's sensitivity on a per-use case basis to account for the nuances of different data streams.

The human-AI collaboration system 204 allows for leveraging human expertise in the loop improves accuracy of drift detection and reduces disruptive false detections through confirmation of true drifts and sensitivity tuning based on feedback. The collaboration combines the benefits of automation with human judgement.

The concept drift detection system (implemented in post-deployment system 126) could be applied to machine learning models in many different industries beyond insurance, including:

Fraud detection—Monitor for drifts in fraud patterns in credit card transactions, claims, etc. Retrain models to detect new fraud types.

Supply chain—Detect changes in product demand, pricing, or delivery times. Adapt inventory and pricing models.

Healthcare—Identify shifts in patient health metrics or costs. Update risk and resource allocation models.

Marketing—Detect changes in customer engagement with campaigns. Retrain models targeting customer segments.

Automotive—Monitor for hardware failures or maintenance needs. Adapt predictive maintenance models.

Financial Services—Identify changes in lending risk or investment patterns. Update credit and trading models.

Cybersecurity—Detect new malware, phishing, or intrusion types. Retrain threat detection models.

Recommendation systems—Monitor for changes in customer preferences. Adapt product recommendation models.

The key is applying automated drift detection and retraining for any predictive models applied to non-stationary data streams, where relationships can evolve over time. This allows the models to stay relevant in dynamic environments across many industries. The framework provides a generalizable solution.

Figure 3:
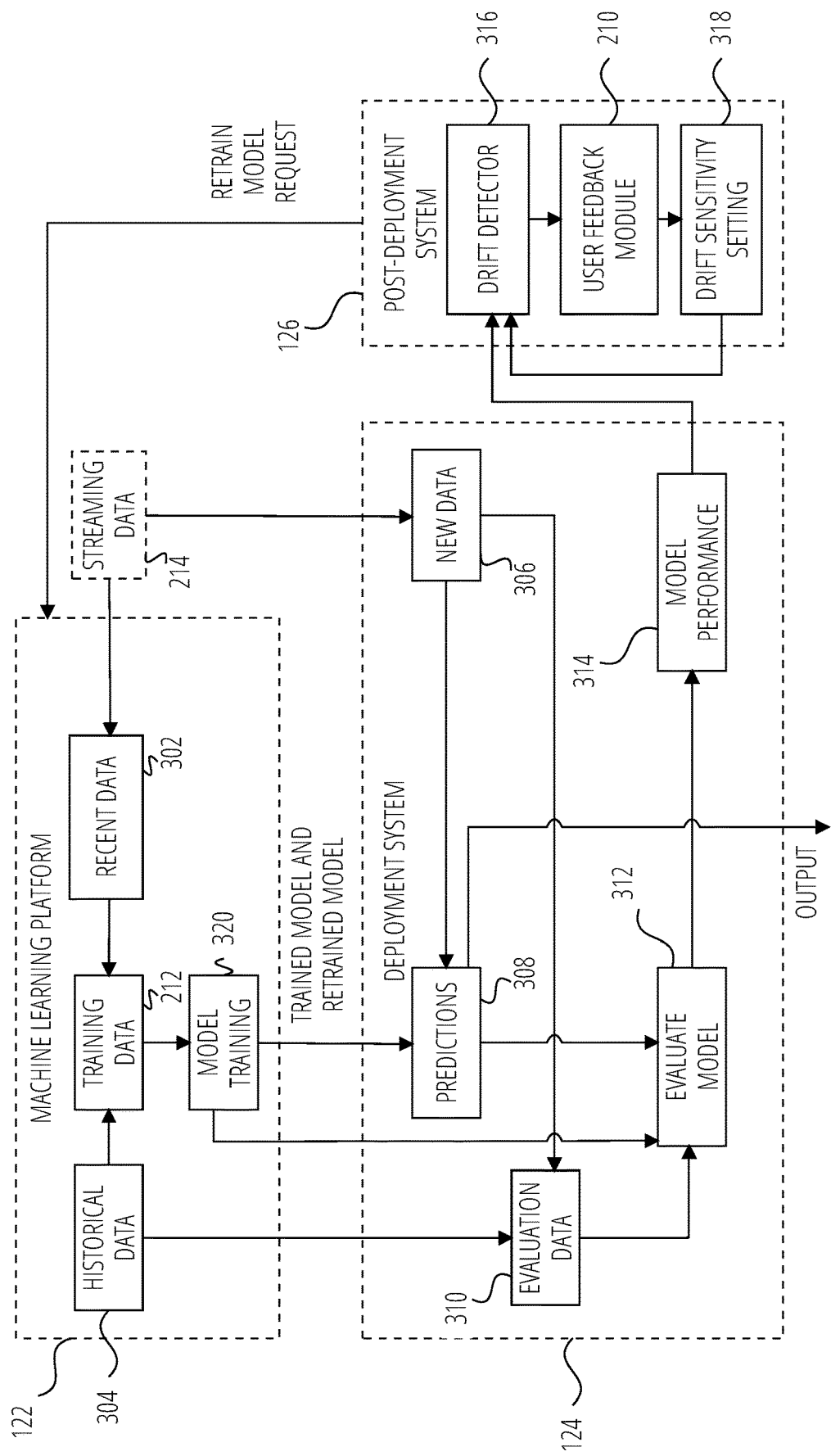
FIG. 3 illustrates interactions between a machine learning platform, a deployment system, and a post-deployment system in accordance with one example embodiment.

FIG. 3 illustrates interactions between a machine learning platform, a deployment system, and a post-deployment system in accordance with one example embodiment.

The machine learning platform 122 includes historical data 304, training data 212, historical data 304 and model training 320.

The deployment system 124 includes new data 306, predictions 308, evaluation data 310, evaluate model 312, and model performance 314. The deployment system 124 handles deploying machine learning models trained by the machine learning platform 122 so they can be used to generate predictions.

The deployment system 124 receives the trained model produced by the model training 320. This represents the model after initial training on the historical data 304. The deployment system 124 deploys the trained model into a production environment where it can be used to generate prediction on new data.

The deployed model generates predictions 308 on new data 306 from streaming data 214 (that comes in after deployment). As the deployed model generates predictions 308, the evaluate model 312 evaluates the predictions against ground truth labels to track model performance 314 over time.

The post-deployment system 126 includes a drift detector 316, user feedback module 210 and drift sensitivity setting 318. If the drift detector 316 detects a concept drift (based on the user feedback), it can request retraining the model from the machine learning platform 122. The deployment system 124 helps integrate this updated model into production.

In one example, the post-deployment system 126 could be used for insurance risk modeling. Insurance risk models predict the risk associated with policyholders based on factors like past claims, vehicle type, driving history etc. These models are trained on historical claims data. But risk profiles and claim patterns can change over time, causing concept drift. Without drift detection, an outdated risk model will provide inaccurate risk assessments and quotes as new claims data comes in. The proposed drift detection system would monitor the performance of the deployed risk model on new claims streaming in. A drift detector like ADWIN would analyze the model's accuracy over time windows and detect if a significant drop occurs, indicating potential drift. It would generate a warning and report detailing changes in claims data distribution, model performance metrics, etc. An expert (e.g., user feedback module 210) reviews the report and confirms if a real drift occurred. If so, they initiate retraining on all historical+new claims data. This keeps the risk model updated to any changes in claim patterns, ensuring accurate policyholder risk assessments over time. As such, drift detection avoids extended periods of inaccurate predictions that could occur if relying only on periodic manual model reviews. The proposed automated drift detection and retraining system is well suited to insurance risk modeling as it adapts the models to changing claim trends. This maintains prediction accuracy over time.

In the example case of insurance modeling, the following example data points are collected over time to effectively monitor for concept drift in insurance risk modeling:

Claims data:
Frequency of claims for each policyholder
Types of claims (collision, theft, etc.)
Claim amounts/severity
Claim locations
Policyholder data:
Demographics (age, gender, marital status, occupation)
Vehicle details (make, model, year, usage, mileage)
Driving history (accidents, tickets, DUIs)
Address/location
Policy details (coverage types, limits)
External factors:
Weather data for claim locations
Traffic accident statistics Vehicle model safety ratings
Local economic conditions
Crime rates The core data streams needed are the ongoing claims data tied to policyholders, as changes here are a key indicator of concept drift in the underlying risk. Supplementary data on policyholders, vehicles, and external factors provides additional context on what factors may be driving changes in claims patterns.

Collecting comprehensive data across these categories allows the system to detect when claim frequencies, costs, or relationships to risk factors shift over time. This powers drift detection and retraining for up-to-date, accurate risk models.

Figure 4:
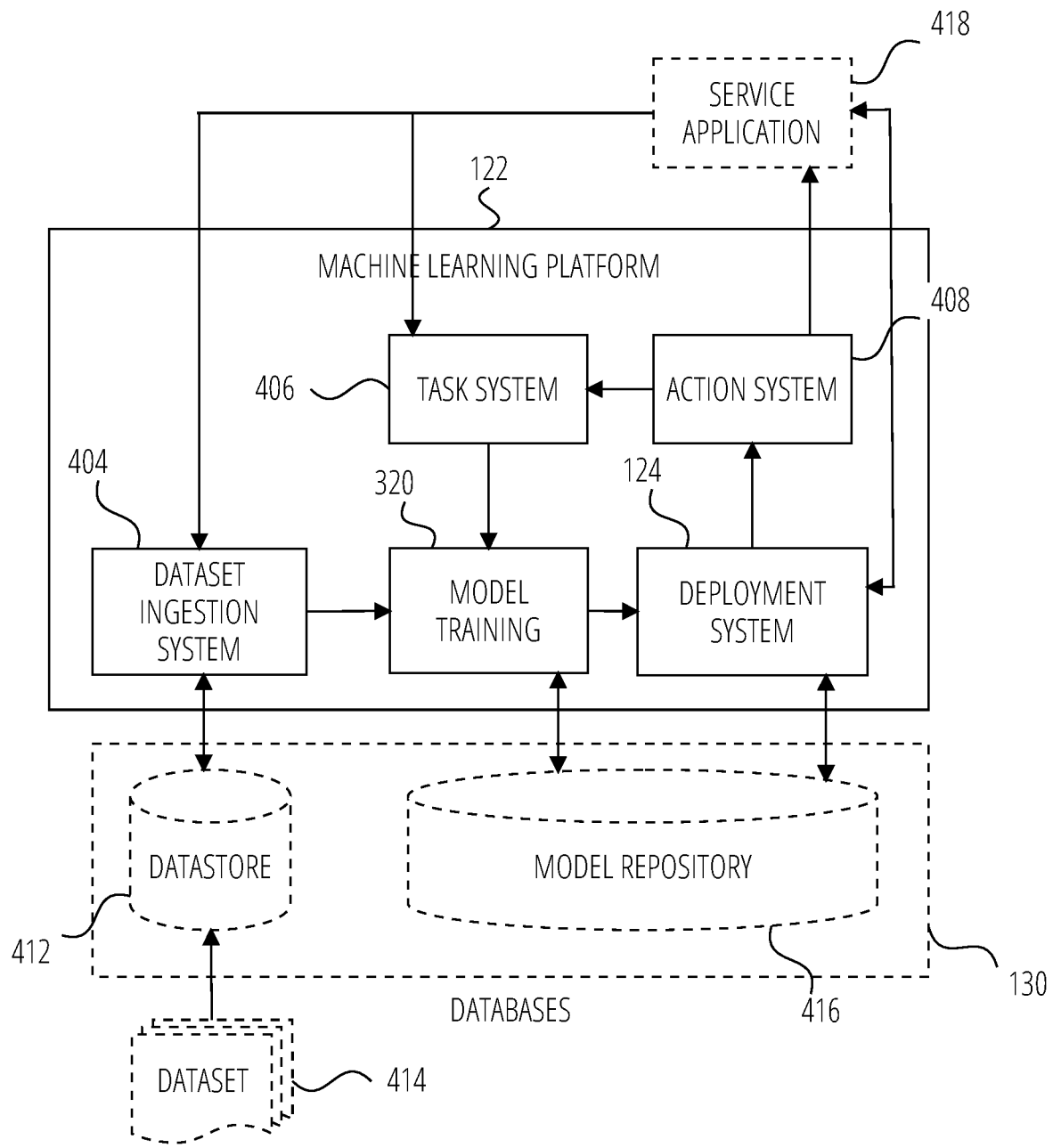
FIG. 4 illustrates a machine learning platform in accordance with one example embodiment.

FIG. 4 illustrates a machine learning platform 122 in accordance with one example embodiment. The machine learning platform 122 includes a dataset ingestion system 404, a model trainer 410, the deployment system 124, a task system 406, an action system 408.

The dataset ingestion system 404 acquires training data for the model trainer 410 from a datastore 412 at the databases 130. The datastore 412 includes a dataset provided by the client device 106, the service application 418, or the third-party application 114. In one example embodiment, the dataset ingestion system 404 annotates the training data with statistical properties (e.g., mean, variance, n-ordered differences) and tags (e.g., parts of speech for words in the text data, days of week for date-time values, anomaly flagging for continuous data). In another example embodiment, the dataset ingestion system 404 analyzes the training data and determines whether additional training data (relevant or complimentary to the training data) are available to further augment the training data. In one example, the dataset ingestion system 404 requests the client device 106 to provide additional data. In another example, the dataset ingestion system 404 accesses a library of datasets in the datastore 412 and augments the training data with at least one of the dataset from the library of datasets. In yet another example, the dataset ingestion system 404 accesses a marketplace of datasets (e.g., provided by the third-party application 114) to identify a dataset to augment the training data. For example, a data set includes a column of zip codes. The dataset ingestion system 404 identifies the data as zip codes and offers to augment the data set by adding another dataset such as "mean income" for each zip code from a library of other datasets (e.g., latitude, longitude, elevation, weather factors, social factor).

In another example embodiment, the dataset ingestion system 404 includes an advisor feature that advises the client device 106 (that provides the dataset 414) on how to prepare the dataset 414 for processing by the model trainer 410. For example, the dataset ingestion system 404 analyzes a structure of the dataset 414 and advises the client device 106 that the dataset contains missing values that should be amended before processing by the model trainer 410. In one example, the dataset ingestion system 404 estimates the missing values based on approximation.

The task system 406 defines a task for the model trainer 410. For example, the task identifies parameters of a goal (e.g., problem to be solved, target column, data validation and testing method, scoring metric). The task system 406 receives a definition of the task from the client device 106, the service application 418, or the third-party application 114. In another example, the task system 406 receives an updated task from the action system 408. The task system 406 can also define non-machine learning tasks, such as data transformations and analysis.

The model trainer 410 uses a machine learning algorithm to train a machine learning model based on the data from the dataset ingestion system 404 and the task from the task system 406. In one example, the model trainer 410 forms and optimizes a machine learning model to solve the task defined in the task system 406. Example embodiments of the model trainer 410 are described further below with respect to FIG. 5.

In one example, the deployment system 124 is part of the machine learning platform 122. The deployment system 124 includes a deployment engine (not shown) that deploys the machine learning model to other applications (that are external to the machine learning platform 122). For example, the deployment system 124 provisions an infrastructure such that the machine learning model may exist in a query-able setting and be used to make predictions upon request. An example of a deployment includes uploading of the machine learning model or parameters to replicate such a model to the deployment system 124, such that the deployment system 124 may then support the machine learning model and expose the relevant functionalities.

In another example, the deployment system 124 enables the service application 418 to access and use the machine learning model to generate forecasts and predictions on new data. The deployment system 124 stores the model in a model repository 416 of the databases 130.

The action system 408 triggers an external action (e.g., a call to the service application 418) based predefined conditions. For example, the action system 408 detects that the deployment system 124 has deployed the machine learning model. In response to detecting the deployment of the machine learning model, the action system 408 notifies the service application 418 (e.g., by generating and communicating an alert of the deployment to the service application 418). Other examples of actions from the action system 408 include retraining of the machine learning model, updating of model parameters, stopping the model functioning if performance is below a threshold (failsafe feature), communicating (via email/text/messaging platform) alerts based on performance or usage.

In one example, the deployment system 124 or the post-deployment system 126 monitors the deployment of the machine learning model. For example, the deployment system 124/post-deployment system 126 continuously monitors a performance of the machine learning model (used by the service application 418) and provides a feedback to the dataset ingestion system 404 and the task system 406 via the action system 408. For example, the service application 418 provides an updated task to the task system 406 and latest data to the dataset ingestion system 404. This process may be referred to as meta learning. In another example, the deployment system 124/post-deployment system 126 may also monitor characteristics of the data such as frequency of missing values or outliers, and employ different strategies to remedy these issues. The deployment system 124/post-deployment system 126 thus refines which strategies to use for a given situation by learning which strategy is most effective.

In one example embodiment, the deployment system 124/post-deployment system 126 monitors a performance of the machine learning model. For example, the deployment system 124/post-deployment system 126 intermittently assesses the performance of the machine learning model as new data comes in, such that an updated score can be derived representing the model's most recent performance. In another example, the deployment system 124/post-deployment system 126 quantifies and monitors the sensitivity of the machine learning model to noise by perturbing the data and assessing the impact on model scores/predictions. After updating a machine learning model, the deployment system 124/post-deployment system 126 may also test the machine learning model on a set of holdout data to ensure it is appropriate for deployment (e.g., by comparing the performance of a new model to the performance of previous models). Model performance can also be quantified in terms of compute time and required resources such that if the frequency or type of data being ingested changes causing a drop in efficiency or speed, the user may be alerted to this.

The deployment system 124/post-deployment system 126 determines whether the performance/accuracy of the machine learning model is acceptable (e.g., above a threshold score). If the deployment system 124/post-deployment system 126 determines that the performance/accuracy of the machine learning model is no longer acceptable, the action system 408 redefines the task at the task system 406 or suggests changes to the training data at dataset ingestion system 404. For example, if performance is no longer acceptable, the action system 408 raises an alert to the user 132 through communication means (e.g., email/text), and provide suggestions of the cause of the problem and remedial steps. The action system 408 can also update the model based on the latest data or stop the model from making predictions. In another example embodiment, these action behaviors may be defined by the user in an "if this then that" fashion.

Figure 5:
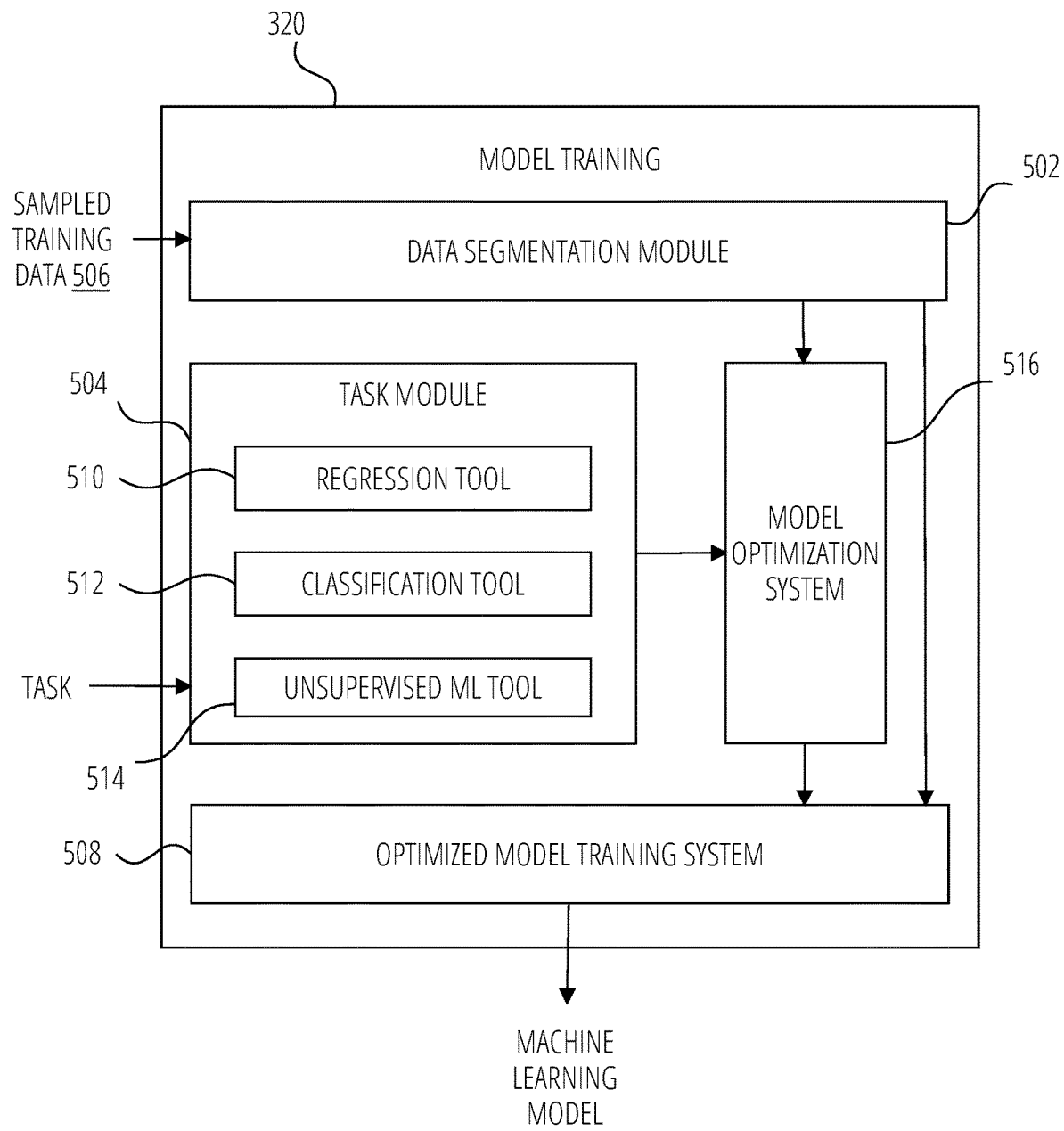
FIG. 5 illustrates model training in accordance with one example embodiment.

FIG. 5 illustrates a model trainer 410 in accordance with another example embodiment. The model trainer 410 includes a data segmentation module 502, a task module 504, a model optimization system 516, and an optimized model training system. The data segmentation module 502 receives sampled training data 506. The data segmentation module 502 summarizes the data. For example, data is summarized by calculating summary statistics and describing the sample's distribution. Continuous values are binned and counted. Outliers and anomalies are flagged. The data segmentation module 502 further slices the summarized data into data slices such that a mathematical definition of information contained in the original data is equally distributed between the data slices. This is achieved by stratification of data partitions; ensuring that the data distributions between slices are as closely matched as possible. The data segmentation module 502 provides the data slices to the model optimization system 516.

The client device 106 provides the user-defined task to task module 504. The task module 504 includes different types of machine learning tools: a regression tool 510, a classification tool 512, and an unsupervised ML tool 514. The task module 504 maps the user-defined task to the one of the machine learning tools. For example, if the user-defined task has a goal of predicting a categorical value, the task module 504 would map the task to a classification tool. A goal of predicting a continuous value would be mapped to a regression tool. If the user-defined task is to find underlying groupings within the data, it would be mapped to a clustering (unsupervised ML) tool. In one example, a look up table is defined and provides a mapping between different types of task and a type of machine learning tool.

The model optimization system 516 trains a machine learning model based on the data slices and the type of machine learning tool. An example embodiment of the model optimization system 516 is described further below with respect to FIG. 6.

The optimized model training system 508 receives the optimized machine learning model from the model optimization system 516, retrains the model with all available and appropriate data, and provides the trained optimized machine learning model to the client device 106.

Figure 6:
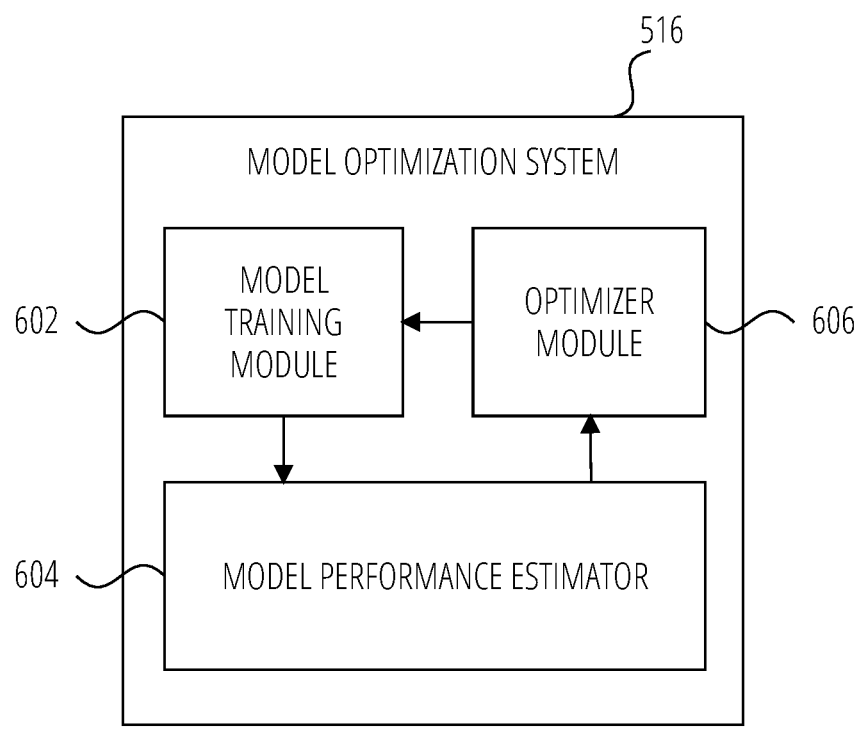
FIG. 6 illustrates a model optimization system in accordance with one example embodiment.

FIG. 6 illustrates a model optimization system in accordance with one example embodiment. The model optimization system 516 includes a model training module 602, an optimizer module 606, and a model performance estimator 604. The optimizer module 606 suggests a specific model. The specific model is defined through a set of hyper-parameters. These are a collection of named values, which together fully specify a particular model ready for model fitting on some training data.

The model training module 602 trains the specific model using multiple data subsets. The model performance estimator 604 calculates a score representing the performance of the specific model. The optimizer module 606 receives the score and suggests another specific model based on the score. Given a model as, for example, a random forest, the model is trained using multiple data sets. The performance can be computed using, as an example, a loss function. If the score is below a threshold, the optimizer module 606 will navigate the space of hyper-parameters following, as an example, the gradients of the loss function. A new set of values for the model hyper-parameters will be suggested.

Figure 7:
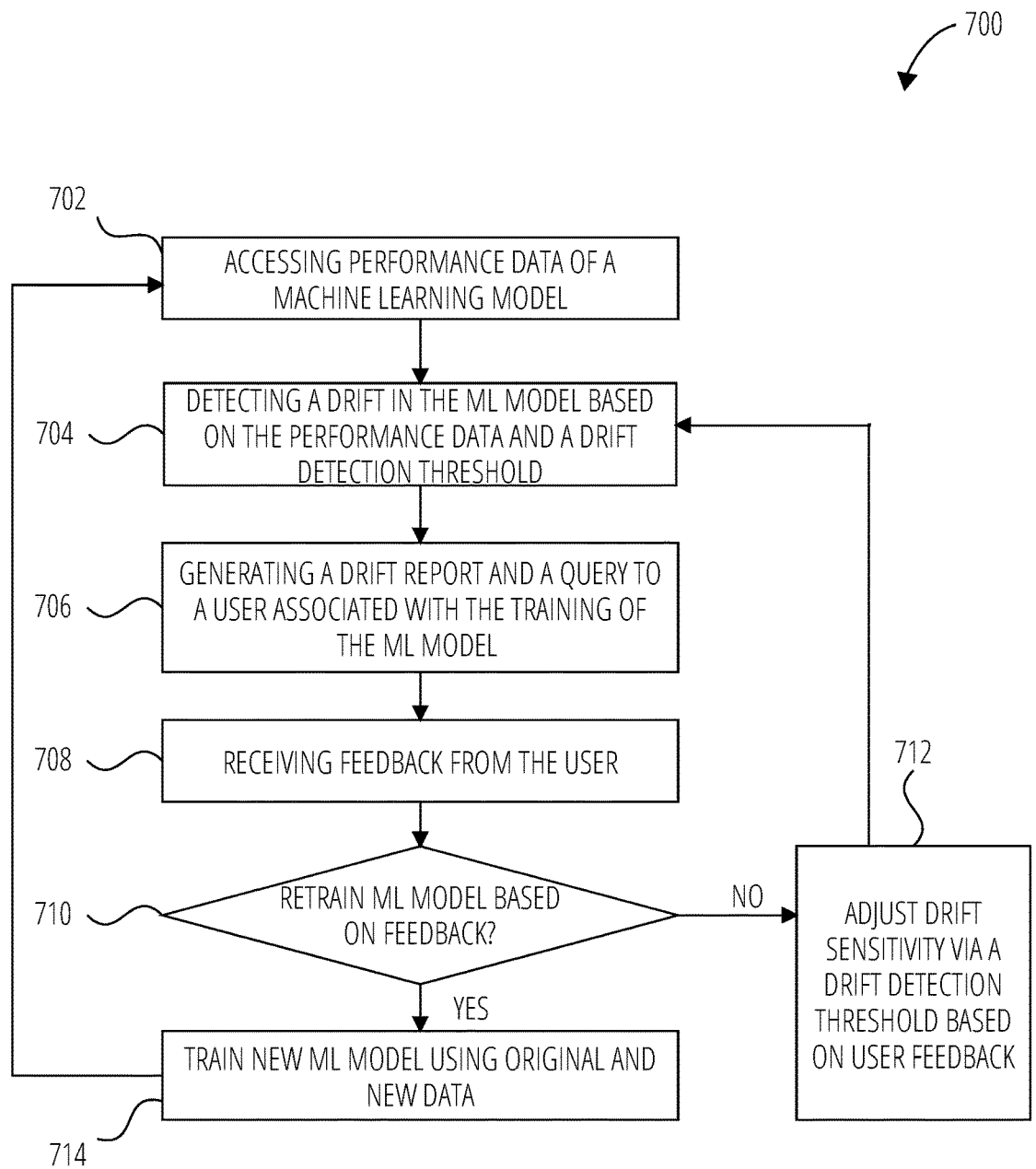
FIG. 7 illustrates a method for training a model in accordance with one example embodiment.

FIG. 7 illustrates a method for a post-deployment drift detection system in accordance with one example embodiment. The method 700 may be performed by one or more computational devices, as described below.

The method 700 begins at block 702 by accessing performance data of a deployed machine learning model. The performance data reflects the model's accuracy on both initial training data and additional data collected after deployment.

At block 704, the method 700 detects whether a drift, or change, has occurred in the machine learning model by analyzing the performance data and comparing it to a defined drift detection threshold.

If a drift is detected, the method 700 generates a drift report and query to the user associated with training the model at block 706. This notifies the user that drift has been detected.

At block 708, the method 700 receives feedback from the user responding to the query. The user reviews the drift report and confirms whether a real drift has occurred or if it is a false detection.

The method 700 checks at block 710 to see if the user feedback indicates the drift is real and retraining should occur.

If yes, at block 712 the method retrains the machine learning model using both the original training data and new data collected since deployment. Retraining improves model accuracy.

If the user feedback disconfirms the drift at block 710, the method 700 instead adjusts the drift detection threshold and sensitivity at block 714 based on the feedback. This adapts the detector to reduce false detections.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 8:
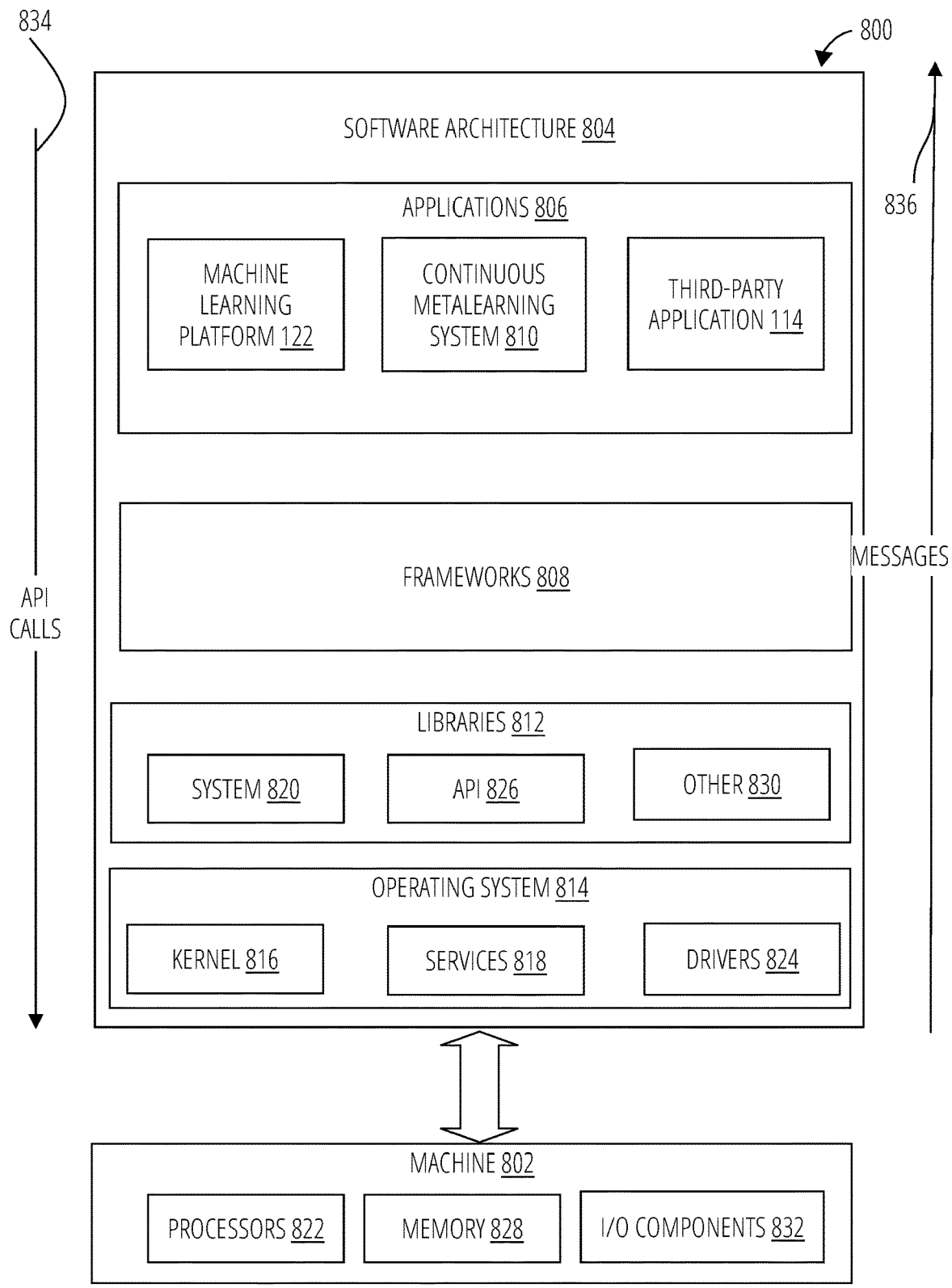
FIG. 8 is block diagram showing a software architecture within which the present disclosure may be implemented, according to an example embodiment.

FIG. 8 is a block diagram 800 illustrating a software architecture 804, which can be installed on any one or more of the devices described herein. The software architecture 804 is supported by hardware such as a machine 802 that includes Processors 822, memory 828, and I/O Components 832. In this example, the software architecture 804 can be conceptualized as a stack of layers, where each layer provides a particular functionality. The software architecture 804 includes layers such as an operating system 814, libraries 812, frameworks 808, and applications 806. Operationally, the applications 806 invoke API calls 834 through the software stack and receive messages 836 in response to the API calls 834.

The operating system 814 manages hardware resources and provides common services. The operating system 814 includes, for example, a kernel 816, services 818, and drivers 824. The kernel 816 acts as an abstraction layer between the hardware and the other software layers. For example, the kernel 816 provides memory management, Processor management (e.g., scheduling), Component management, networking, and security settings, among other functionality. The services 818 can provide other common services for the other software layers. The drivers 824 are responsible for controlling or interfacing with the underlying hardware. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 812 provide a low-level common infrastructure used by the applications 806. The libraries 812 can include system libraries 820 (e.g., C standard library) that provide functions such as memory allocation functions, string manipulation functions, mathematic functions, and the like. In addition, the libraries 812 can include API libraries 826 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 812 can also include a wide variety of other libraries 830 to provide many other APIs to the applications 806.

The frameworks 808 provide a high-level common infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example embodiment, the applications 806 may include a machine learning platform 122, A continuous metalearning system 810, and a broad assortment of other applications such as a third-party application 114. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 114 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 114 can invoke the API calls 834 provided by the operating system 814 to facilitate functionality described herein.

Figure 9:
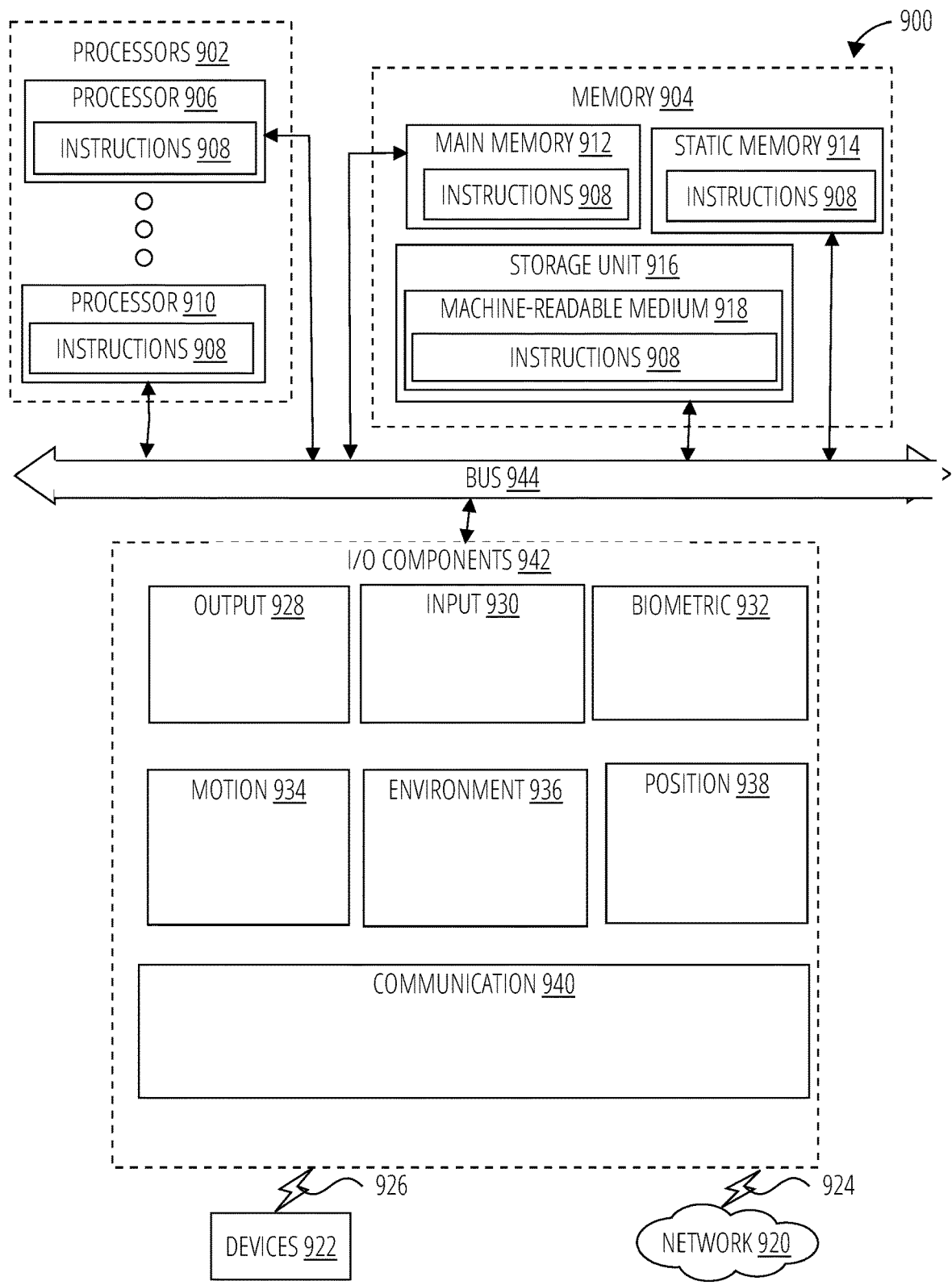
FIG. 9 is a diagrammatic representation of a machine in the form of a computer system within which a set of instructions may be executed for causing the machine to perform any one or more of the methodologies discussed herein, according to an example embodiment.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include Processors 902, memory 904, and I/O Components 942, which may be configured to communicate with each other via a bus 944. In an example embodiment, the Processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 906 and a Processor 910 that execute the instructions 908. The term "Processor" is intended to include multi-core Processors that may comprise two or more independent Processors (sometimes referred to as "cores") that may execute instructions contemporaneously. Although FIG. 9 shows multiple Processors 902, the machine 900 may include a single Processor with a single core, a single Processor with multiple cores (e.g., a multi-core Processor), multiple Processors with a single core, multiple Processors with multiples cores, or any combination thereof.

The memory 904 includes a main memory 912, a static memory 914, and a storage unit 916, both accessible to the Processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the Processors 902 (e.g., within the Processor's cache memory), or any suitable combination thereof, during execution thereof by the machine 900.

The I/O Components 942 may include a wide variety of Components to receive input, provide output, produce output, transmit information, exchange information, capture measurements, and so on. The specific I/O Components 942 that are included in a particular machine will depend on the type of machine. For example, portable machines such as mobile phones may include a touch input device or other such input mechanisms, while a headless server machine will likely not include such a touch input device. It will be appreciated that the I/O Components 942 may include many other Components that are not shown in FIG. 9. In various example embodiments, the I/O Components 942 may include output Components 928 and input Components 930. The output Components 928 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 930 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 942 may include biometric Components 932, motion Components 934, environmental Components 936, or position Components 938, among a wide array of other Components. For example, the biometric Components 932 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 934 include acceleration sensor Components (e.g., accelerometer), gravitation sensor Components, rotation sensor Components (e.g., gyroscope), and so forth. The environmental Components 936 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 938 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 942 further include communication Components 940 operable to couple the machine 900 to a network 920 or devices 922 via a coupling 924 and a coupling 926, respectively. For example, the communication Components 940 may include a network interface Component or another suitable device to interface with the network 920. In further examples, the communication Components 940 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 922 may be another machine or any of a wide variety of peripheral devices (e.g., a peripheral device coupled via a USB).

Moreover, the communication Components 940 may detect identifiers or include Components operable to detect identifiers. For example, the communication Components 940 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, and/or memory of the Processors 902) and/or storage unit 916 may store one or more sets of instructions and data structures (e.g., software) embodying or used by any one or more of the methodologies or functions described herein. These instructions (e.g., the instructions 908), when executed by Processors 902, cause various operations to implement the disclosed embodiments.

The instructions 908 may be transmitted or received over the network 920, using a transmission medium, via a network interface device (e.g., a network interface Component included in the communication Components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a computer-implemented method comprising: accessing, at a server, a predictive performance metric of a machine learning model that is deployed at the server, the machine learning model being trained with an initial set of training data containing historical data, the predictive performance metric being based on the initial set of training data and an additional set of training data, the additional set of training data containing training data collected since the machine learning model was trained with the initial set of training data; detecting a predictive model performance drift based on the predictive performance metric exceeding a drift detection threshold that determines a drift sensitivity of the machine learning model to drift; in response to detecting the predictive model performance drift, generating a drift warning notification to a client device, the drift warning notification indicating that the predictive performance metric exceeds the drift detection threshold; receiving a drift feedback from the client device; and adjusting one of the machine learning model or the drift detection threshold to alter the drift sensitivity based on the drift feedback.

In Example 2, the subject matter of Example 1 includes, wherein the drift feedback indicates a user confirmation of the drift, wherein adjusting the machine learning model further comprises: retraining the machine learning model with the initial set of training data and the additional set of training data.

In Example 3, the subject matter of Examples 1-2 includes, wherein the drift feedback indicates a user rejection of the drift, wherein adjusting the drift detection threshold further comprises: reducing false drift detections by reducing the drift sensitivity of the machine learning model via increasing the drift detection threshold of the machine learning model.

In Example 4, the subject matter of Examples 1-3 includes, wherein training the machine learning model further comprises: training a predictive model using the initial set of training data containing historically collected data to generate the predictive model.

In Example 5, the subject matter of Examples 1-4 includes, retrieving a default drift sensitivity parameter based the initial set of training data; and setting the drift detection threshold of the machine learning model based on the default drift sensitivity parameter.

In Example 6, the subject matter of Examples 1-5 includes, increasing the drift sensitivity by reducing the drift detection threshold of the machine learning model.

In Example 7, the subject matter of Examples 1-6 includes, decreasing the drift sensitivity by increasing the drift detection threshold of the machine learning model.

In Example 8, the subject matter of Examples 1-7 includes, determining a frequency of false drift notifications based on a plurality of user feedbacks; and adjusting the drift sensitivity of the machine learning model via the drift detection threshold of the machine learning model based on the frequency of false drift notifications.

In Example 9, the subject matter of Examples 1-8 includes, wherein the historical data comprises insurance Examples and policyholder details for insurance risk modeling, wherein the additional set of training data comprises additional insurance claims and additional policy details since the machine learning model was trained with the initial set of training data.

In Example 10, the subject matter of Examples 1-9 includes, wherein the additional set of training data includes streaming data generated subsequent to the training data.

Example 11 is a computing apparatus comprising: a Processor; and a memory storing instructions that, when executed by the Processor, configure the apparatus to: access, at a server, a predictive performance metric of a machine learning model that is deployed at the server, the machine learning model being trained with an initial set of training data containing historical data, the predictive performance metric being based on the initial set of training data and an additional set of training data, the additional set of training data containing training data collected since the machine learning model was trained with the initial set of training data; detect a predictive model performance drift based on the predictive performance metric exceeding a drift detection threshold that determines a drift sensitivity of the machine learning model to drift; in response to detecting the predictive model performance drift, generate a drift warning notification to a client device, the drift warning notification indicating that the predictive performance metric exceeds the drift detection threshold; receive a drift feedback from the client device; and adjust one of the machine learning model or the drift detection threshold to alter the drift sensitivity based on the drift feedback.

In Example 12, the subject matter of Example 11 includes, wherein the drift feedback indicates a user confirmation of the drift, wherein adjusting the machine learning model further comprises: retrain the machine learning model with the initial set of training data and the additional set of training data.

In Example 13, the subject matter of Examples 11-12 includes, wherein the drift feedback indicates a user rejection of the drift, wherein adjusting the drift detection threshold further comprises: reduce false drift detections by reducing the drift sensitivity of the machine learning model via increasing the drift detection threshold of the machine learning model.

In Example 14, the subject matter of Examples 11-13 includes, wherein training the machine learning model further comprises: train a predictive model using the initial set of training data containing historically collected data to generate the predictive model.

In Example 15, the subject matter of Examples 11-14 includes, wherein the instructions further configure the apparatus to: retrieve a default drift sensitivity parameter based the initial set of training data; and set the drift detection threshold of the machine learning model based on the default drift sensitivity parameter.

In Example 16, the subject matter of Examples 11-15 includes, wherein the instructions further configure the apparatus to: increase the drift sensitivity by reducing the drift detection threshold of the machine learning model.

In Example 17, the subject matter of Examples 11-16 includes, wherein the instructions further configure the apparatus to: decrease the drift sensitivity by increasing the drift detection threshold of the machine learning model.

In Example 18, the subject matter of Examples 11-17 includes, wherein the instructions further configure the apparatus to: determine a frequency of false drift notifications based on a plurality of user feedbacks; and adjust the drift sensitivity of the machine learning model via the drift detection threshold of the machine learning model based on the frequency of false drift notifications.

In Example 19, the subject matter of Examples 11-18 includes, wherein the historical data comprises insurance Examples and policyholder details for insurance risk modeling, wherein the additional set of training data comprises additional insurance claims and additional policy details since the machine learning model was trained with the initial set of training data.

Example 20 is a non-transitory computer-readable storage medium, the computer-readable storage medium including instructions that when executed by a computer, cause the computer to: access, at a server, a predictive performance metric of a machine learning model that is deployed at the server, the machine learning model being trained with an initial set of training data containing historical data, the predictive performance metric being based on the initial set of training data and an additional set of training data, the additional set of training data containing training data collected since the machine learning model was trained with the initial set of training data; detect a predictive model performance drift based on the predictive performance metric exceeding a drift detection threshold that determines a drift sensitivity of the machine learning model to drift; in response to detecting the predictive model performance drift, generate a drift warning notification to a client device, the drift warning notification indicating that the predictive performance metric exceeds the drift detection threshold; receive a drift feedback from the client device; and adjust one of the machine learning model or the drift detection threshold to alter the drift sensitivity based on the drift feedback.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A computer-implemented method comprising:
   accessing, at a server, a predictive performance metric of a machine learning model that is deployed at the server, the machine learning model being trained with an initial set of training data containing historical data, the predictive performance metric being based on the initial set of training data and an additional set of training data, the additional set of training data containing training data collected since the machine learning model was trained with the initial set of training data;
   detecting a predictive model performance drift based on the predictive performance metric exceeding a drift detection threshold that determines a drift sensitivity of the machine learning model to drift, wherein the drift detection threshold is determined by a $\Delta$ sensitivity parameter of an adaptive-window drift detector;
   in response to detecting the predictive model performance drift, generating a drift warning notification to a client device, the drift warning notification indicating that the predictive performance metric exceeds the drift detection threshold;
   receiving a drift feedback from the client device, wherein the drift feedback indicates a user rejection of the drift; and
   altering the drift sensitivity based on the drift feedback by adjusting the drift detection threshold of the machine learning model and by determining a frequency of false drift notifications based on a plurality of user feedbacks evaluated over a sliding evaluation window, and modifying the $\Delta$ sensitivity parameter of the adaptive-window drift detector by increasing the $\Delta$ sensitivity parameter when the frequency of false drift notifications exceeds a prescribed threshold or decreasing the $\Delta$ sensitivity parameter when the frequency of false drift notifications is below the prescribed threshold,
   wherein adjusting the drift detection threshold comprises: reducing false drift detections by reducing the drift sensitivity of the machine learning model via increasing the drift detection threshold of the machine learning model.

2. The computer-implemented method of claim 1, wherein the drift feedback indicates a user confirmation of the drift,
   wherein adjusting the machine learning model further comprises:
   retraining the machine learning model with the initial set of training data and the additional set of training data.

3. The computer-implemented method of claim 1, wherein training the machine learning model further comprises:
   training a predictive model using the initial set of training data containing historically collected data to generate the predictive model.

4. The computer-implemented method of claim 1, further comprising:
   retrieving a default drift sensitivity parameter based the initial set of training data; and
   setting the drift detection threshold of the machine learning model based on the default drift sensitivity parameter.

5. The computer-implemented method of claim 1, further comprising:

increasing the drift sensitivity by reducing the drift detection threshold of the machine learning model.

6. The computer-implemented method of claim 1, further comprising:
decreasing the drift sensitivity by increasing the drift detection threshold of the machine learning model.

7. The computer-implemented method of claim 1, further comprising:
retrieving a default drift sensitivity parameter that is pre-computed from the initial set of training data; and
initializing the drift detection threshold of the machine learning model based on the default drift sensitivity parameter prior to monitoring for model drift.

8. The computer-implemented method of claim 1, wherein the historical data comprises insurance claims and policyholder details for insurance risk modeling,
wherein the additional set of training data comprises additional insurance claims and additional policy details since the machine learning model was trained with the initial set of training data.

9. The computer-implemented method of claim 1, wherein the additional set of training data includes streaming data generated subsequent to the training data.

10. A computing apparatus comprising:
a processor; and
a memory storing instructions that, when executed by the processor, configure the apparatus to:
access, at a server, a predictive performance metric of a machine learning model that is deployed at the server, the machine learning model being trained with an initial set of training data containing historical data, the predictive performance metric being based on the initial set of training data and an additional set of training data, the additional set of training data containing training data collected since the machine learning model was trained with the initial set of training data;
detect a predictive model performance drift based on the predictive performance metric exceeding a drift detection threshold that determines a drift sensitivity of the machine learning model to drift, wherein the drift detection threshold is determined by a Δ sensitivity parameter of an adaptive-window drift detector;
in response to detecting the predictive model performance drift, generate a drift warning notification to a client device, the drift warning notification indicating that the predictive performance metric exceeds the drift detection threshold;
receive a drift feedback from the client device, wherein the drift feedback indicates a user rejection of the drift; and
alter the drift sensitivity based on the drift feedback by adjusting the drift detection threshold of the machine learning model and by determining a frequency of false drift notifications based on a plurality of user feedbacks evaluated over a sliding evaluation window, and modifying the Δ sensitivity parameter of the adaptive-window drift detector by increasing the Δ sensitivity parameter when the frequency of false drift notifications exceeds a prescribed threshold or decreasing the Δ sensitivity parameter when the frequency of false drift notifications is below the prescribed threshold,
wherein adjusting the drift detection threshold comprises:
reducing false drift detections by reducing the drift sensitivity of the machine learning model via increasing the drift detection threshold of the machine learning model.

11. The computing apparatus of claim 10, wherein the drift feedback indicates a user confirmation of the drift,
wherein adjusting the machine learning model further comprises:
retrain the machine learning model with the initial set of training data and the additional set of training data.

12. The computing apparatus of claim 10, wherein training the machine learning model further comprises:
train a predictive model using the initial set of training data containing historically collected data to generate the predictive model.

13. The computing apparatus of claim 10, wherein the instructions further configure the apparatus to:
retrieve a default drift sensitivity parameter based the initial set of training data; and
set the drift detection threshold of the machine learning model based on the default drift sensitivity parameter.

14. The computing apparatus of claim 10, wherein the instructions further configure the apparatus to:
increase the drift sensitivity by reducing the drift detection threshold of the machine learning model.

15. The computing apparatus of claim 10, wherein the instructions further configure the apparatus to:
decrease the drift sensitivity by increasing the drift detection threshold of the machine learning model.

16. The computing apparatus of claim 10, wherein the instructions further configure the apparatus to:
retrieve a default drift sensitivity parameter that is pre-computed from the initial set of training data; and
initialize the drift detection threshold of the machine learning model based on the default drift sensitivity parameter prior to monitoring for model drift.

17. The computing apparatus of claim 10, wherein the historical data comprises insurance claims and policyholder details for insurance risk modeling,
wherein the additional set of training data comprises additional insurance claims and additional policy details since the machine learning model was trained with the initial set of training data.

18. A non-transitory computer-readable storage medium, the computer-readable storage medium including instructions that when executed by a computer, cause the computer to:
access, at a server, a predictive performance metric of a machine learning model that is deployed at the server, the machine learning model being trained with an initial set of training data containing historical data, the predictive performance metric being based on the initial set of training data and an additional set of training data, the additional set of training data containing training data collected since the machine learning model was trained with the initial set of training data;
detect a predictive model performance drift based on the predictive performance metric exceeding a drift detection threshold that determines a drift sensitivity of the machine learning model to drift, wherein the drift detection threshold is determined by a Δ sensitivity parameter of an adaptive-window drift detector;
in response to detecting the predictive model performance drift, generate a drift warning notification to a client device, the drift warning notification indicating that the predictive performance metric exceeds the drift detection threshold;
receive a drift feedback from the client device, wherein the drift feedback indicates a user rejection of the drift; and alter the drift sensitivity based on the drift feedback by adjusting the drift detection threshold of the machine learning model and by determining a frequency of false drift notifications based on a plurality of user feedbacks evaluated over a sliding evaluation window, and modifying the $\Delta$ sensitivity parameter of the adaptive-window drift detector by increasing the $\Delta$ sensitivity parameter when the frequency of false drift notifications exceeds a prescribed threshold or decreasing the $\Delta$ sensitivity parameter when the frequency is below the threshold, wherein adjusting the drift detection threshold comprises: reducing false drift detections by reducing the drift sensitivity of the machine learning model via increasing the drift detection threshold of the machine learning model.

* * * * *